T. CROWE.
FAUCET, TAP, VALVE, BALL COCK, AND THE LIKE.
APPLICATION FILED MAY 26, 1908.

918,288.

Patented Apr. 13, 1909.

WITNESSES

INVENTOR
T. CROWE.

UNITED STATES PATENT OFFICE.

THOMAS CROWE, OF HAMILTON, ONTARIO, CANADA.

FAUCET, TAP, VALVE, BALL-COCK, AND THE LIKE.

No. 918,288.  Specification of Letters Patent.  Patented April 13, 1909.

Application filed May 26, 1908. Serial No. 435,015.

*To all whom it may concern:*

Be it known that I, THOMAS CROWE, of the city of Hamilton, in the county of Wentworth, in the Province of Ontario, Canada, have invented certain new and useful Improvements in Faucets, Taps, Valves, Ball-Cocks, and the Like, of which the following is the specification.

My invention relates to improvements in faucets, taps, valves, ball cocks and the like, and the object of the invention is to devise a valve in which the liability of leakage is reduced to a minimum.

A further object is to make the valve durable and effectual in operation and the faucet cheap to manufacture.

To effect these objects I have constructed the seat of my tap with a reduced screw portion fitting into a correspondingly threaded orifice in the bridge and a central orifice which flares outwardly at the top to form a narrow rounded annular upper edge or seat proper.

I have constructed the valve portion with the bottom of the stem provided with an annular groove, a cap fitting on to the bottom of the stem and held thereon by a pin extending through the same and the groove. The bottom end of the cap is provided with an annular rim and a washer made for the major part preferably of comparatively soft metal with an annular groove in the bottom face thereof fitted within the rim and held therein by a screw projecting into the cap, the groove being adapted when the valve is closed to abut the annular edge seat and the parts being otherwise constructed and arranged as hereinafter more particularly explained.

Figure 1:
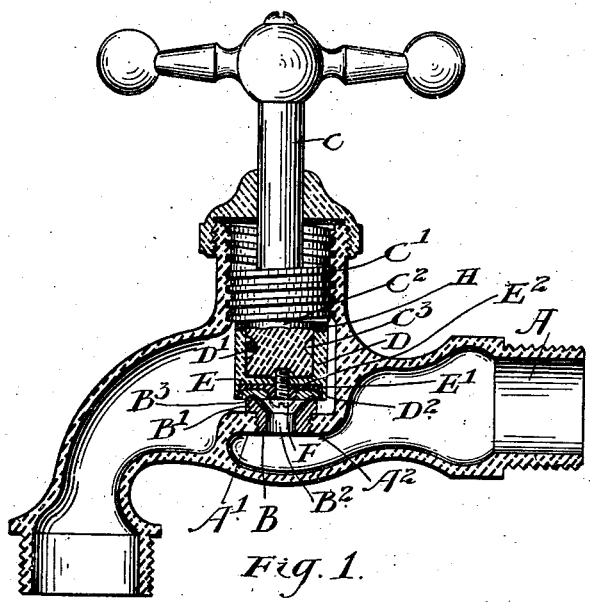
Figure 4:
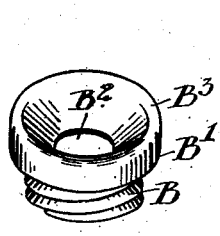
Figure 3:
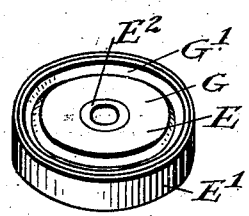
Figure 2:
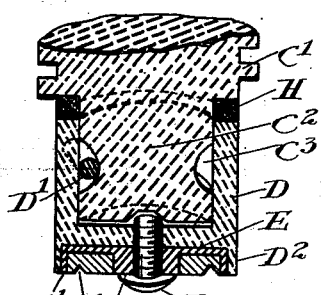

Figure 1, is a sectional view of a faucet provided with my improvement. Fig. 2, is an enlarged sectional detail of the lower portion of the valve. Fig. 3, is a detail of the valve washer. Fig. 4, is a perspective detail of the valve seat.

In the drawings like letters of reference indicate corresponding parts in each figure.

A is a faucet, which is formed with a bridge A' having a threaded orifice A².

B is the removable seat, which is provided with a screw threaded lower portion and an enlarged upper portion forming a shoulder B'.

B² is a central orifice, which flares outwardly at the top, so as to give a fine edge seat B³.

C is the valve stem, which is provided with an enlarged threaded portion C', which is designed to work in a correspondingly threaded turret of the faucet.

C² is the lower or valve portion of the tap, which is of less diameter than the screw portion and is provided with an annular groove C³.

D is a cap U-shaped in cross-section, which is held on the end C² by means of a key D' passing through the cap and annular groove C³. The cap D is provided with an annular rim D² and within this rim is secured a washer E consisting of an outer shell E' of hard metal, such as bronze, brass or the like having a central hollow boss E² through which extends the screw F through the center of the cap D. Within the shell is fitted or molded an annulus G of soft metal, such as Babbitt metal and in the outer face of the annulus I provide an annular groove G' preferably of V-shape in cross section.

Although in taps and faucets I preferably make this central annulus G of soft metal it will, of course, be understood that the whole washer E may be made of hard metal or of soft metal.

H is a rubber washer extending between the upper edge of the cap and the bottom of the enlargement C'. The cap D is a loose fit on the end C², so that the annular groove G' may be brought home evenly upon the fine edge set B³, thus forming a double seat.

Such a form of valve, as I describe, I find in practice is most effectual in its operation and eliminates to a minimum the possibility of leakage.

What I claim as my invention is:

A tap comprising a bridge, an annular seat having a conical opening therein, a valve having a cap loosely fitting the bottom end of the valve, said bottom end having an annular groove therein, a key passing through the cap and said groove, a circular recess in the end of the cap, a washer in said recess and having an annular flange, and a central boss having a hole therein, a screw passing through the hole in the boss into the cap, and a filling of soft metal in the washer between the outer flange and the boss, said soft filling having an annular groove therein adapted to engage the edge of the seat.

THOMAS CROWE.

Witnesses:
E. F. LAZIER,
J. P. McGOWAN.